US006284354B1

(12) United States Patent
Nishiyama

(10) Patent No.: US 6,284,354 B1
(45) Date of Patent: Sep. 4, 2001

(54) HEAT RAY SCREENING TRANSPARENT RESIN STRUCTURE AND HEAT RAY SCREENING FILM LAMINATE

(75) Inventor: Masanori Nishiyama, Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/205,377

(22) Filed: Dec. 4, 1998

(30) Foreign Application Priority Data

Dec. 8, 1997 (JP) .................................................. 9-336985

(51) Int. Cl.[7] ...................................................... B32B 7/02
(52) U.S. Cl. ........................ 428/213; 428/220; 428/332; 428/412; 428/480; 428/500; 428/913
(58) Field of Search ..................................... 428/212, 332, 428/500, 480, 220, 412, 213, 913

(56) References Cited

U.S. PATENT DOCUMENTS

| 4,799,745 | * | 1/1989 | Meyer et al. ........................... 350/1.7 |
| 5,130,183 | * | 7/1992 | Muromachi et al. .................. 428/216 |
| 5,189,551 | * | 2/1993 | Woodard ............................... 359/360 |
| 5,308,706 | * | 5/1994 | Kawaguchi et al. .................. 428/426 |
| 5,431,976 | * | 7/1995 | Etchu et al. .......................... 428/65.3 |
| 5,811,197 | * | 9/1998 | Nishiyama et al. ................... 428/480 |
| 6,034,813 | * | 3/2000 | Woodard et al. ..................... 359/360 |

FOREIGN PATENT DOCUMENTS

| A-8-229980 | 9/1996 | (JP) . |
| A-8-258080 | 10/1996 | (JP) . |
| A-9-164552 | 6/1997 | (JP) . |

* cited by examiner

Primary Examiner—Bruce H. Hess
Assistant Examiner—B. Shewareged
(74) Attorney, Agent, or Firm—Sughrue, Mion, Zinn, Macpeak & Seas, PLLC

(57) ABSTRACT

A heat ray screening film laminate comprises a heat ray screening film and a transparent resin film formed on at least one side of the heat ray screening film and is characterized in that the ratio of the melting point of the transparent resin film to the melting point of the base film of the heat ray screening film is 0.5 to 0.95, the haze of the laminate is 5% or less, the transmittance of visible radian having a wavelength of 400 to 750 nm is 55% or more and the transmittance of near infrared radiation having a wavelength of 750 to 2,100 nm is 50% or less. A structure comprises the laminate and a transparent resin sheet formed on the laminate.

According to the present invention, there can be obtained a structure comprising the heat ray screening film laminate and the transparent resin sheet which are firmly bonded together and having fine appearance.

24 Claims, No Drawings

HEAT RAY SCREENING TRANSPARENT RESIN STRUCTURE AND HEAT RAY SCREENING FILM LAMINATE

DETAILED DESCRIPTION OF THE INVENTION

The present invention relates to a heat ray screening film laminate and to a heat ray screening transparent resin structure comprising a transparent resin sheet and the laminate formed on the transparent resin sheet. More specifically, it relates to a heat ray screening transparent resin structure which comprises a transparent resin sheet and a heat ray screening film formed on one side of the transparent resin sheet and which is lighter and safer and has higher workability than transparent glass and to a heat ray screening film laminate for the structure.

Since the heat ray screening transparent resin structure of the present invention is a sheet structure having transparency and a heat ray screening function, it is lighter and safer and has higher workability than conventionally used glass or glass window and has an excellent effect of maintaining temperature within a space due to its heat ray screening function.

A heat ray screening film laminate is generally a laminate comprising a transparent polyester film as a base film and an optical laminate (heat ray screening layer) consisting of a metal thin film layer of gold, silver, copper or the like and transparent dielectric layers having a high refractive index which sandwich the metal thin film layer. The heat ray screening film laminate transmits visible radiation but reflects the radiation of near infrared to infrared regions well.

Making use of this property, the heat ray screening film laminate is used to reduce heat radiation from a monitoring window at a high-temperature working site, screen solar energy input from the window of a building, car or train to improve an air-conditioning effect, improve the heat screening properties of a transparent plant container or improve the cooling effect of a refrigerating show case.

Most of the base materials of these transparent openings are made of a glass sheet to which a heat ray screening film laminate is adhered by a self-adhesive.

In recent years, more and more transparent resin (plastic) sheets have been used in place of glass sheets because they are less dangerous, more easily handled, lighter in weight and more inexpensive and have higher workability than glass sheets. When a heat ray screening film laminate is adhered to such a laminate by a conventional self-adhesive, air bubbles are readily formed by residual gas generated from the self-adhesive at high temperatures, thereby impairing the transparent appearance of the structure.

To solve this problem, various types of self-adhesives have been studied. However, one which can satisfy requirements for practical application could not be found yet because fluctuations in adhesion caused by the time changes of the self-adhesive and the tackiness of the self-adhesive itself deteriorate handling properties within the process.

Although the inventor of the present invention tried a process for thermally contact-bonding a heat ray screening film laminate to a transparent resin sheet directly, a structure having excellent bond strength and transparency could not be obtained. Even when a transparent resin sheet was formed by feeding a molten resin onto the surface of a heat ray screening film laminate, a structure having excellent bond strength could not be obtained and the heat ray screening film laminate was easily broken.

It is a first object of the present invention to provide a heat ray screening film laminate which can be firmly and easily bonded to a transparent resin sheet which is used as a base material for a transparent opening or the like.

It is a second object of the present invention to provide a transparent structure having fine appearance and comprising a heat ray screening film laminate and a transparent resin sheet which are firmly bonded together.

The present inventor has conducted studies to attain the above objects and has found that when a transparent resin film of a resin having a melting point lower than the melting point of a resin forming a heat ray screening film in a specified range is formed on one side of the heat ray screening film, a transparent resin sheet is bonded to the heat ray screening film through the transparent resin film and the adhesion surface of the transparent resin film is firmly bonded and has fine appearance.

According to the present invention, there is provided the following heat ray screening transparent resin structure. This heat ray screening transparent resin structure comprises:

(1) a heat ray screening film (A) having a heat ray screening layer on one side,
(2) a transparent resin film (B), and
(3) a transparent resin sheet (C), all of which are laminated together in the order named, and is characterized in that:
   (i) the ratio (Tm/Tmr) of the melting point (Tm) of a resin forming the transparent resin film (B) to the melting point (Tmr) of a resin forming the heat ray screening film (A) is 0.5 to 0.95,
   (ii) the haze value of a laminate comprising the heat ray screening film (A) and the transparent resin film (B) is 5% or less,
   (iii) the integrated transmittance of visible radiation having a wavelength of 400 to 750 nm of the laminate is 55% or more, and
   (iv) the integrated transmittance of near infrared radiation having a wavelength of 750 to 2,100 nm of the laminate is 50% or less.

According to the present invention, there is also provided the following heat ray screening film laminate.

The heat ray screening film laminate comprises:

(1) a heat ray screening film (A) having a heat ray screening layer on one side, and
(2) a transparent resin film (B), all of which are laminated together in the order named, and is characterized in that:
   (i) the ratio (Tm/Tmr) of the melting point (Tm) of a resin forming the transparent resin film (B) to the melting point (Tmr) of a resin forming the heat ray screening film (A) is 0.5 to 0.95,
   (ii) the haze value of the laminate comprising the heat ray screening film (A) and the transparent resin film (B) is 5% or less,
   (iii) the integrated transmittance of visible radiation having a wavelength of 400 to 750 nm of the laminate is 55% or more, and
   (iv) the integrated transmittance of near infrared radiation having a wavelength of 750 to 2,100 nm of the laminate is 50% or less.

The present invention will be described in detail hereinunder. A description is first given of the heat ray screening film laminate and then of the heat ray screening transparent resin structure and its production process.

As described above, the heat ray screening film laminate of the present invention comprises (1) a heat ray screening film (A) having a heat ray screening layer on one side and (2) a transparent resin film (B).

A base film forming the above heat ray screening film (A) is preferably a thermoplastic resin film which is transparent, flexible and heat resistant to stand operation temperature when a metal deposited film is formed by sputtering or vacuum deposition.

Polymers which can form the thermoplastic resin film include polyesters such as polyethylene terephthalate and polyethylene-2,6-naphthalate, aliphatic polyamides, aromatic polyamides, polyethylene, polypropylene and the like. Out of these, polyesters are preferred. Out of thermoplastic resin films, a biaxially oriented polyethylene terephthalate film having excellent heat resistance and mechanical strength is particularly preferred.

The thermoplastic resin film (base film) can be produced by conventionally known methods. For example, a biaxially oriented polyester film can be produced by drying a polyester chip, melting the chip with an extruder at a temperature of Tm to (Tm+70)°C. (Tm: melting point of polyester), extruding it onto a rotary cooling drum from a die (such as a T-die or I-die), quenching at 40 to 90° C. to form an unstretched film, stretching the unstretched film to 2.5 to 8.0 times in a longitudinal direction at a temperature of (Tg−10) to (Tg+70)°C. (Tg: glass transition temperature of polyester) and to 2.5 to 8.0 times in a transverse direction and heat setting the biaxially oriented film at a temperature of 180 to 250° C. for 1 to 60 seconds as required. The thickness of this base film is preferably 25 to 250 $\mu$m, particularly preferably 50 to 200 $\mu$m.

A heat ray screening layer is formed on one side of the base film of the heat ray screening film (A) used in the present invention. A metal substance forming the heat ray screening layer is a semiconductor substance having a wide optical band gap and a high free electron density, such as Sb-doped $SnO_2$ or Sn-doped $In_2O_3$ (ITO), or a metal such as Au, Ag, Cu or Al. Out of these, Ag which rarely absorbs visible radiation is particularly preferred. Two or more metals may be used as required. The metal layer is preferably formed by vapor phase growth, particularly preferably vacuum deposition, sputtering or plasma CVD. The thickness of the metal layer must be controlled such that the integrated transmittance of visible radiation having a wavelength of 400 to 750 nm of the film laminate of the present invention should be 55% or more and the integrated transmittance of near infrared radiation having 750 to 2,100 nm should be 50% or less. The thickness of the metal layer is preferably 5 to 1,000 nm. When the thickness is smaller than 5 nm, a sufficient heat ray screening effect cannot be obtained and the transmittance of infrared radiation becomes high. When the thickness is larger than 1,000 nm, the transmittance of visible radiation lowers and transparency deteriorates.

A dielectric layer having transparency and a high refractive index is preferably formed on the heat ray screening film (A) used in the present invention to suppress the reflection of visible radiation and enhance transparency. A dielectric forming the dielectric layer is $TiO_2$, $ZrO_2$, $SnO_2$, $In_2O_3$ or the like. $TiO_2$ and $ZrO_2$ derived from an organic compound and obtained by hydrolyzing alkyl titanate and alkyl zirconium, respectively, are more preferred because they have excellent workability. In addition, a single layer or multiple layers of indium oxide or tin oxide may be used as the dielectric layer. The dielectric layer is preferably formed by vapor phase growth, particularly preferably vacuum deposition, sputtering or plasma CVD. When the above metal layer is sandwiched by the dielectric layers, the effect of improving transparency is increased advantageously. The thickness of the dielectric layer must be controlled together with the thickness of the above metal layer to satisfy the optical characteristic range of the film laminate. The thickness of the dielectric layer is preferably in the range of 0 to 750 nm.

The heat ray screening film (A) used in the present invention comprises a heat resistant base film formed by depositing a metal by sputtering and a resin forming the film (A) is a thermoplastic resin having a high melting point as described above. Therefore, it is difficult to fusion bond this base film to the transparent resin sheet having a low melting point due to a large difference of melting temperature between them. To improve adhesion between the heat ray screening film (A) and the transparent resin sheet (C), a transparent resin film (B) having a low melting temperature must be formed on one side of the heat ray screening film (A).

A resin forming the transparent resin film (B) is preferably a thermoplastic resin, and the ratio (Tm/Tmr) of the melting point (Tm) of the resin forming the transparent resin film (B) to the melting point (Tmr) of a resin forming the heat ray screening film (A) must be in the range of 0.5 to 0.95. When this ratio is smaller than 0.5, it is difficult to laminate the heat ray screening film (A) on the transparent resin sheet (C). When the ratio is larger than 0.95, adhesion between the film laminate of the present invention and the transparent resin sheet (C) lowers disadvantageously.

The melting point of a resin in the present invention is defined as a peak temperature (°C.) in the case of a crystalline resin which has a clear peak temperature measured by a differential scanning calorimeter (DSC) or a glass transition temperature (°C.) in the case of a non-crystalline resin. It is known that a polycarbonate resin comprising bisphenol A as a bisphenol component has a melting point and this temperature is considered as a melting point. However, in the case of a resin having no melting point such as other amorphous polycarbonate resin, the glass transition temperature (Tg) thereof is considered as a melting point.

The resin forming the transparent resin film (B) is preferably a thermoplastic resin, particularly preferably a resin having a melting point of 100 to 240° C., such as a polyester typified by polyethylene terephthalate, polycarbonate, polyethylene or polypropylene. When the base film of the heat ray screening film (A) is a biaxially oriented polyethylene terephthalate film, the transparent resin film (B) is preferably a polycarbonate film or a copolyethylene terephthalate film. It is advantageous that this copolyethylene terephthalate should have a melting point of 180 to 240° C.

The copolymerizable component of the copolyethylene terephthalate may be an acid component or a glycol component. Illustrative examples of the acid component include aromatic dibasic acids such as isophthalic acid, phthalic acid and naphthalenedicarboxylic acid and alicyclic dicarboxylic acids such as adipic acid, azelaic acid, sebacic acid and decanedicarboxylic acid. Illustrative examples of the glycol component include aliphatic diols such as butanediol and hexanediol and alicyclic diols such as cyclohexane dimethanol. They may be used alone or in combination of two or more.

Specific examples of the polycarbonate include aromatic polycarbonates comprising bisphenol as a dihydroxy component. The polycarbonate is particularly preferably a polycarbonate comprising bisphenol A bonded to phenol through an isopropylidene group as a dihydroxy component because it has excellent thermal properties and adhesion to the transparent resin sheet (C).

The thermoplastic resin forming the transparent resin film (B) is polycarbonate/polyethylene terephthalate alloy or a modified product thereof.

The thickness of the transparent resin film (B) is preferably 25 to 750 μm. When the thickness is less than 25 μm, the appearance of the film (B) deteriorates. The thickness is particularly preferably 50 to 500 μm.

Roughly, there are two methods for laminating the transparent resin film (B) on the heat ray screening film (A). One is to extrude and laminate the transparent resin film (B) on the heat ray screening film (A) by coextrusion when the base film of the heat ray screening film (A) is formed. In this case, a heat ray screening layer is formed by vapor deposition on the surface of the base film of the laminate film obtained by the coextrusion method. The other is to form a film laminate by joining together the heat ray screening film (A) and the transparent resin film (B) with an acrylic or urethane-based adhesive. In this case, the transparent resin film (B) may be formed on either side of the heat ray screening film (A). That is, the transparent resin film (B) may be formed on the heat ray screening layer side or its opposite side of the heat ray screening film (A).

A hard coat layer may be formed on the surface of the heat ray screening layer to protect the heat ray screening layer of the film laminate of the present invention or prevent it from being scratched. Even when the transparent resin film (B) is formed on the heat ray screening layer side of the heat ray screening film (A), it is preferred to form a hard coat layer on a side opposite to the heat ray screening layer side of the heat ray screening film (A). This hard coat layer is formed using a known acrylic or silicone-based hard coating. The hard coat layer is formed by bar coating, doctor coating, reverse-roll coating, gravure-roll coating or other known coating, and the coating film preferably has a thickness of 1 to 10 μm.

The hard coat layer may be formed directly on the surface, or a polyethylene terephthalate film having a hard coat layer may be formed on the surface with an adhesive.

The film laminate comprising the heat ray screening film (A) and the transparent resin film (B) of the present invention has a total thickness of 50 to 1,000 μm, preferably 75 to 750 μm. When the total thickness is smaller than 50 μm, handling and machining works become difficult, thereby reducing yield. When the total thickness is larger than 1,000 μm, the film laminate is difficult to be handled as a long film roll product.

The heat ray screening film laminate of the present invention must be transparent because it is used in a transparent portion of an opening such as a glass window and the haze value of the laminate must be 5% or less. When the haze value is larger than 5%, transparency becomes unsatisfactory disadvantageously. Therefore, it is preferred to use the base film of the heat ray screening film (A) and the transparent resin film (B) which contain additives and impurities as little as possible and have transparency.

The heat ray screening film laminate of the present invention must has an integrated transmittance of visible radiation having a wavelength of 400 to 750 nm of 55% or more, preferably 60% or more and an integrated transmittance of near infrared radiation having a wavelength of 750 to 2,100 nm of 50% or less, preferably 40% or less to exhibit the effect of maintaining the transparency of a transparent portion of an opening and the effect of screening heat rays. When the integrated transmittance of visible radiation is less than 55%, the transparency of the laminate deteriorates disadvantageously and when he integrated transmittance of near infrared radiation is more than 50%, the heat ray screening effect of the laminate lowers disadvantageously.

A description is subsequently given of the heat ray screening resin structure comprising the above heat ray screening film laminate and the transparent resin sheet (C) formed on the laminate. The structure of the present invention is characterized in that the transparent resin sheet (C) is formed on the transparent resin film (B) side of the heat ray screening film laminate and firmly bonded to the heat ray screening film laminate directly without using an adhesive or self-adhesive. This bonding is carried out by a method which will be described hereinafter and both the transparent resin sheet (C) and the heat ray screening film laminate are firmly joined together by surface fusion or thermal contact-bonding.

The transparent resin sheet (C) to be laminated on the film laminate may be generally used as organic glass and have transparency and strength. Stated more specifically, it is a transparent sheet formed from a polycarbonate resin, polymethyl methacrylate resin, acrylonitrile-styrene copolymer, polystyrene resin, methyl methacrylate-styrene copolymer or polyolefin resin. Out of these, a polycarbonate resin sheet is the most preferred.

The transparent resin sheet (C) may be colorless or colored if it is transparent. The transparent resin sheet (C) has an integrated transmittance of visible radiation of 30% or more, preferably 40% or more.

The transparent resin sheet (C) has a thickness of 2 to 15 mm, preferably 3 to 12 mm.

According to studies conducted by the present inventor, it has been found that lamination between the heat ray screening film laminate and the transparent resin sheet (C) can be carried out by the following two methods advantageously.

Molding Method (I)

A molten transparent resin is molded into a sheet on the surface of the transparent resin film (B) side of the film laminate comprising the heat ray screening film (A) having a heat ray screening layer on one side and the transparent resin film (B).

This molding method (I) is to mold a molten transparent resin into a sheet on the surface of the film (B) side of the film laminate. It is advantageous that the film laminate should be placed on one side of a mold and a molten resin should be poured into the mold (injection molding method). Alternatively, the film laminate may be disposed horizontally and a molten resin may be cast on the film laminate and molded.

Molding Method (II)

The laminate comprising the heat ray screening film (A) having a heat ray screening layer on one side and the transparent resin film (B) is thermally contact-bonded to the heated transparent resin sheet (C) in such a manner that the transparent resin film (B) is brought into contact with the transparent resin sheet (C).

This molding method (II) is to thermally contact-bond the film laminate to the molded transparent resin sheet (C). Thermal contact-bonding is carried out by heating the lamination surface of the transparent resin sheet (C) at a temperature of Tm to (Tm±110° C.) (Tm is the melting point of the transparent resin film (B)). Thus, a structure comprising the film laminate and the transparent resin sheet (C) can be obtained.

The heat ray screening resin structure obtained by the above method has a total thickness of 3 to 15 mm, preferably 5 to 12 mm and an integrated transmittance of visible radiation of 20% or more, preferably 30% or more.

The following examples are given to further illustrate the present invention. The properties of the films were measured in accordance with the following methods.

(1) Measurement of Melting Point and Glass Transition Temperature (Tm or Tmr)

The melting point and glass transition temperature of the base film of the heat ray screening film (A) and the transparent resin film (B) were measured independently using the 910 DSC of Dupont Instruments at a temperature elevation rate of 20° C./min. The amount of each sample was about 20 mg.

(2) Integrated Transmittance of Visible Radiation and integrated Transmittance of near Infrared Radiation The integrated transmittance of visible radiation and the integrated transmittance of near infrared radiation of the heat ray screening film laminate were measured at the following wavelength ranges using the UV-3101 PC of Shimadzu Corp. in accordance with JIS-A 5759.

wavelength of visible radiation: 400 to 750 nm wavelength near infrared radiation: 750 to 2,100 nm (3) Haze This was measured using the haze measuring instrument (NDH-2D) of Nippon Denshoku Kogyo Co., Ltd.

(4) Adhesion

A sample prepared by bonding a heat ray screening film laminate to a transparent resin sheet was immersed in hot water heated at 100° C. for 2 hours and the heat ray screening film was cut with a cutter to form one hundred 1 mm² squares. After an adhesive tape was affixed to the squares and removed, the adhesion of the sample was evaluated from a count number of unremoved squares.

○: 100

Δ: 90 to 99

X: 89 or less

EXAMPLE 1

A 10 nm-thick indium oxide layer (dielectric layer: first layer) was formed on one side of a 50 μm-thick biaxially oriented polyethylene terephthalate film (may be referred to as "PET film" hereinafter). A 12 nm-thick silver thin film layer (metal layer: second layer) was formed on the surface of this first layer and then a 20 nm-thick indium oxide layer (dielectric layer: third layer) was formed on the surface of the silver thin film layer to form a heat ray screening film (A). The formation of the first to third layers was carried out under vacuum (5×10⁻⁵ Torr) by sputtering.

Further, a polyfunctional acrylic resin which can be cured by ultraviolet radiation was applied to the heat ray screening layer to a coating thickness after drying of 5 μm to form a hard coat layer for the surface protection of the heat ray screening layer.

Thereafter, copolyethylene terephthalate (co-PET) containing 12 mol % of isophthalic acid was molten at 280° C., extruded and quenched to form an unstretched film which was then stretched to 3.0 times in a longitudinal direction at 100° C. and then to 3.1 times in a transverse direction at a stretching start temperature of 110° C. and a stretching end temperature of 160° C. sequentially and then heat set at 190° C. to form a 50 μm-thick transparent resin film (B). This transparent resin film (B) was laminated on a side opposite to the hard coat layer side of the heat ray screening film (A) with an urethane-based adhesive to form a heat ray screening film laminate. The characteristic properties of this laminate are shown in Table 1.

This heat ray screening film laminate was set in a mold for extrusion molding and a polycarbonate molten by heating at 325° C. was injection molded to give a polycarbonate transparent resin sheet (having a thickness of 7 mm). Adhesion between this polycarbonate sheet and the heat ray screening film laminate is shown in Table 1.

EXAMPLE 2

A laminate film was formed in the same manner as in Example 1 except that co-PET similar to that of Example 1 was extruded from a die when a 50 μm-thick PET film (base film of a heat ray screening film) was formed. A heat ray screening film laminate was formed from this laminate film in the same manner as in Example 1 and a polycarbonate transparent resin sheet was formed in the same manner as in Example 1. The characteristic properties of the heat ray screening film laminate and adhesion between the polycarbonate sheet and the heat ray screening film laminate are shown in Table 1.

EXAMPLE 3

A heat ray screening film laminate was formed in the same manner as in Example 1 except that a 100 μm-thick polycarbonate film was used in place of co-PET and a polycarbonate transparent resin sheet was formed in the same manner as in Example 1. The characteristic properties of the heat ray screening film laminate and adhesion between the polycarbonate sheet and the heat ray screening film laminate are shown in Table 1.

EXAMPLE 4

A 5 μm-thick hard coat layer of a polyfunctional acrylic resin which can be cured by ultraviolet radiation was formed as a protective layer on a polyester film side opposite to the heat ray screening layer side of the heat ray screening film laminate formed in Example 1.

The transparent copolyester film (B) obtained in Example 1 was laminated on the heat ray screening layer of the heat ray screening film (A) with an urethane-based adhesive to form a heat ray screening film laminate.

This heat ray screening laminate was set in a mold in the same manner as in Example 1 and a molten polycarbonate was Injection molded on the copolyester film side to give a polycarbonate transparent resin sheet. Adhesion between the polycarbonate sheet and the heat ray screening film laminate is shown in Table 1.

COMPARATIVE EXAMPLE 1

A heat ray screening film was formed in the same manner as in Example 1 except that a 75 μm-thick PET film was used in place of the 50 μm-thick PET film (base film of a heat ray screening film) and co-PET was not laminated. Further, a polycarbonate transparent resin sheet was formed in the same manner as in Example 1. This heat ray screening film had the same laminate structure as in Example 1 that it substantially comprised a 25 μm-thick PET film and a 50 μm-thick PET film formed on the PET film. The characteristic properties of the heat ray screening film and adhesion between the polycarbonate sheet and the heat ray screening film are shown in Table 1.

TABLE 1

|  | melting temperature of transparent resin (B) [° C.] | Tm/Tmr [—] | haze [%] | integrated transmittance of visible radiation [%] | integrated transmittance of infrared radiation [%] | adhesion [%] |
|---|---|---|---|---|---|---|
| Ex. 1 | 202 | 0.79 | 3.4 | 67 | 46 | ○ |
| Ex. 2 | 202 | 0.79 | 3.6 | 68 | 46 | ○ |
| Ex. 3 | 220 | 0.86 | 2.7 | 71 | 47 | ○ |
| Ex. 4 | 202 | 0.79 | 3.5 | 67 | 46 | ○ |
| C.Ex. 1 | 255 | 1.00 | 2.7 | 71 | 47 | X |

(Notes)
melting point of transparent resin
melting point of polymer: copolyethylene terephthalate and polyethylene terephthalate and polycarbonate According to the present invention, there can be provided a heat ray screening film laminate having excellent transparency, heat ray screening properties and adhesion and a structure comprising the laminate and a transparent resin sheet.

What is claimed is:

1. A heat ray screening transparent resin structure comprising:
   (1) a heat ray screening film (A) having a base film and a heat ray screening layer on one side of the base film,
   (2) a transparent resin film (B) which is positioned on the heat ray screening layer side of the heat ray screening film (A) or is positioned on an opposite side of the heat ray screening layer side of the heat ray screening film (A), and
   (3) a transparent sheet (C), all of which are laminated together in the order named, wherein
      (i) the ratio (Tm/Tmr) of the melting point in ° C. (Tm) of a resin forming the transparent resin film (B) to the melting point in ° C. (Tmr) of a resin forming the heat ray screening film (A) is 0.5 to 0.95,
      (ii) the haze value of a laminate comprising the heat ray screening film (A) and the transparent resin film (B) is 5% or less,
      (iii) the integrated transmittance of visible radiation having a wavelength of 400 to 750 nm of the laminate is 55% or more, and
      (iv) the integrated transmittance of near infrared radiation having a wavelength of 750 to 2,100 nm of the laminate is 50% or less.

2. The structure of claim 1, wherein the heat ray screening film (A) comprises a biaxially oriented polyethylene terephthalate film as the base film.

3. The structure of claim 1, wherein the heat ray screening layer consists of metal layers and dielectric layers which are laminated one upon another alternately.

4. The structure of claim 1, wherein the base film of the heat ray screening film (A) has a thickness of 25 to 250 μm.

5. The structure of claim 1, wherein the transparent resin film (B) is a film of copolyethylene terephthalate having a melting point of 180 to 240° C.

6. The structure of claim 1, wherein the transparent resin film (B) is a film of a polycarbonate resin.

7. The structure of claim 1, wherein the transparent resin film (B) has a thickness of 25 to 750 μm.

8. The structure of claim 1, wherein the transparent resin sheet (C) is formed from a polycarbonate resin, polymethyl methacrylate resin, acrylonitrile-styrene copolymer, polystyrene resin, methyl methacrylate-styrene copolymer or polyolefin resin.

9. The structure of claim 1, wherein the transparent resin sheet (C) is formed from a polycarbonate resin.

10. The structure of claim 1, wherein the transparent resin sheet (C) has a thickness of 2 to 15 mm.

11. The structure of claim 1, wherein a hard coat layer is positioned on an opposite side of the transparent resin film (B) side of the heat ray screening film (A).

12. The structure of claim 1, wherein the heat ray screening film (A) and the transparent resin film (B) are bonded to each other directly by surface fusion or via an adhesive layer interposed therebetween.

13. The structure of claim 1, wherein the transparent resin film (B) and the transparent resin sheet (C) are bonded to each other directly by surface fusion.

14. The structure of claim 1, wherein the transparent resin sheet (C) has an integrated transmittance of visible radiation having a wavelength of 400 to 750 nm of 30% or more.

15. The structure of claim 1 which has a total thickness of 3 to 15 mm.

16. A heat ray screening film laminate comprising:
   (1) a heat ray screening film (A) having a base film and a heat ray screening layer on one side of the base film, and
   (2) a transparent resin film (B) which is formed on the heat ray screening layer side of the heat ray screening film (A) or is formed on an opposite side of the heat ray screening layer side of the heat ray screening film (A), all of which are laminated together in the order named, wherein
      (i) the ratio (Tm/Tmr) of the melting point in ° C. (Tm) of a resin forming the transparent resin film (B) to the melting point in ° C. (Tmr) of a resin forming the heat ray screening film (A) is 0.5 to 0.95,
      (ii) the haze value of the film laminate comprising the heat ray screening film (A) and the transparent resin film (B) is 5% or less,
      (iii) the integrated transmittance of visible radiation having a wavelength of 400 to 750 nm of the laminate is 55% or more, and
      (iv) the integrated transmittance of near infrared radiation having a wavelength of 750 to 2,100 nm of the film laminate is 50% or less.

17. The film laminate of claim 16, wherein the heat ray screening film (A) comprises a biaxially oriented polyethylene terephthalate film as a base film.

18. The film laminate of claim 16, wherein the heat ray screening layer consists of metal layers and dielectric layers which are laminated one upon another alternately.

19. The film laminate of claim 16, wherein the base film of the heat ray screening film (A) has a thickness of 25 to 250 μm.

20. The film laminate of claim 16, wherein the transparent resin film (B) is a film of copolyethylene terephthalate having a melting point of 180 to 240° C.

21. The film laminate of claim 16, wherein the transparent resin film (B) is a film of a polycarbonate resin.

22. The film laminate of claim 16, wherein the transparent resin film (B) has a thickness of 25 to 750 μm.

23. The film laminate of claim 16, wherein a hard coat layer is positioned on an opposite side of the transparent resin film (B) side of the film laminate.

24. The film laminate of claim 16, wherein the heat ray screening film (A) and the transparent resin film (B) are bonded to each other directly by surface fusion or via an adhesive layer interposed therebetween.

* * * * *